(12) United States Patent
Richards et al.

(10) Patent No.: US 10,190,860 B2
(45) Date of Patent: Jan. 29, 2019

(54) CAMSHAFT SIDEWALL MEASURING DEVICES AND METHODS THEREOF

(71) Applicant: Adcole Corporation, Marlborough, MA (US)

(72) Inventors: Paul D. Richards, East Longmeadow, MA (US); Stephen J. Corrado, Westborough, MA (US)

(73) Assignee: Adcole Corporation, Marlborough, MA (US)

( * ) Notice: Subject to any disclaimer, the term of this patent is extended or adjusted under 35 U.S.C. 154(b) by 122 days.

(21) Appl. No.: 15/245,469

(22) Filed: Aug. 24, 2016

(65) Prior Publication Data

US 2017/0059298 A1    Mar. 2, 2017

Related U.S. Application Data

(60) Provisional application No. 62/209,472, filed on Aug. 25, 2015.

(51) Int. Cl.
*G01B 5/008* (2006.01)
*G01B 5/00* (2006.01)

(52) U.S. Cl.
CPC .......... *G01B 5/0002* (2013.01); *G01B 5/003* (2013.01); *G01B 5/008* (2013.01)

(58) Field of Classification Search
CPC ...... G01B 5/0002; G01B 5/003; G01B 5/008; G01B 5/012
USPC .......... 33/519, 503, 504, 556, 558, 559, 591
See application file for complete search history.

(56) References Cited

U.S. PATENT DOCUMENTS

| 2,343,504 | A | | 3/1944 | Gallimore | |
|---|---|---|---|---|---|
| 3,772,829 | A | | 11/1973 | Asano et al. | |
| 4,400,781 | A | | 8/1983 | Hotta et al. | |
| 4,731,934 | A | * | 3/1988 | Barnaby et al. | B23Q 1/5462 33/504 |
| 4,752,166 | A | * | 6/1988 | Lehmkuhl | G01B 5/012 33/504 |

(Continued)

FOREIGN PATENT DOCUMENTS

| WO | WO 2012079734 A1 | * | 6/2012 | ......... B23Q 17/2457 |
|---|---|---|---|---|
| WO | WO 2017144692 A1 | * | 8/2017 | ............. G01B 5/003 |

OTHER PUBLICATIONS

International Search Report for corresponding PCT/US16/48316, dated Nov. 7, 2016, pp. 1-10.

*Primary Examiner* — R. A. Smith
(74) *Attorney, Agent, or Firm* — LeClairRyan PLLC

(57) ABSTRACT

A measuring device includes a rotatable stage configured to receive and rotate an object long a rotational axis of the object. A housing is located adjacent to the rotatable stage and is movable along the rotational axis of the object. The housing has a pivoting arm located between a pair of opposing compression springs which are configured to provide a preload force in a direction parallel to the rotational axis of the object. A probe tip is coupled to the pivoting arm and extends from the housing, the probe tip configured to contact a portion of the object. A displacement measuring device is coupled to the pivoting arm and is configured to measure displacement of the probe tip in the direction parallel to the rotational axis of the object based on movement of the pivoting arm against one of the opposing compression springs.

33 Claims, 6 Drawing Sheets

(56) References Cited

U.S. PATENT DOCUMENTS

| | | | | |
|---|---|---|---|---|
| 5,077,908 A * | 1/1992 | Moore | ................... | G01B 5/201 |
| | | | | 33/550 |
| 5,926,781 A * | 7/1999 | Scott | ...................... | G01B 21/20 |
| | | | | 33/503 |
| 7,197,837 B1 * | 4/2007 | Blanford et al. | ...... | G01B 5/003 |
| | | | | 33/555.1 |
| 8,959,986 B2 * | 2/2015 | Mies | ........................ | G01B 5/28 |
| | | | | 73/105 |
| 9,423,235 B2 * | 8/2016 | Jordil et al. | ........... | G01B 7/287 |
| 2002/0066197 A1 | 6/2002 | Sano et al. | | |
| 2004/0166776 A1 | 8/2004 | Kondo et al. | | |
| 2005/0055839 A1 | 3/2005 | Brenner et al. | | |
| 2005/0204571 A1 * | 9/2005 | Mies et al. | .............. | B23F 23/06 |
| | | | | 33/503 |
| 2006/0201010 A1 | 9/2006 | Maier et al. | | |
| 2017/0341192 A1 * | 11/2017 | Fukuda et al. | ......... | G01B 5/008 |

\* cited by examiner

CAMSHAFT SIDEWALL MEASURING DEVICES AND METHODS THEREOF

This application claims the benefit of U.S. Provisional Patent Application Ser. No. 62/209,472, filed Aug. 25, 2015, which is hereby incorporated by reference in its entirety.

FIELD

This technology generally relates to a measuring device and, more particularly, to a camshaft sidewall measuring device and methods thereof.

BACKGROUND

Engine components, such as crankshafts and camshafts, must be manufactured with precise dimensions. Thus, precision gauging systems are required to measure features of the devices. A number of precision coordinate gauging systems are available for the measurement of such engine components. For example, tactile sensing devices are often utilized to make the required measurements of the camshaft, for example.

Typically, the measurement involving tactile sensing devices includes the use of a follower probe that travels along an axis perpendicular to the axis of rotation of the camshaft being measured to measure features, such as roundness, diameter, and camshaft profile. An exemplary camshaft measurement gauge 10 for making such profile measurements along the axis perpendicular to a camshaft C is illustrated in FIG. 1.

The camshaft measurement gauge 10 includes a rotatable stage 12 configured to receive and rotate the camshaft C about a rotational axis A. A carrier 14 is translatable along the axis A of the camshaft C as installed on the rotatable stage 12. The camshaft measurement gauge 10 includes a radial measuring probe 16 that extends from the carrier 14 and contacts the camshaft C with a constant force to provide a tactile profile measurement perpendicular to the axis A of the camshaft C. The probe 16, however, is limited to measuring the profile of the camshaft C along the axis perpendicular to the camshaft C. Specifically, the probe 16 of the camshaft measurement gauge 10 shown in FIG. 1 does not allow for measurement of a sidewall of the camshaft C.

Federally mandated increases in fuel efficiency have pushed auto makers to develop engines that balance fuel economy and performance. In particular, multiple design variants for variable valve timing have been developed and utilized to increase fuel efficiency by varying valve lift, timing, and duration. These variations in design to meet these federal mandates have resulted in a need to accurately measure the axial profile (i.e., the change in position on-axis radially about the shaft) of camshaft groove side walls.

SUMMARY

A measuring device includes a rotatable stage configured to receive and rotate an object along a rotational axis of the object. A housing is located adjacent to the rotatable stage and is movable along the rotational axis of the object. The housing has a pivoting arm located between a pair of opposing compression springs which are configured to provide a preload force in a direction parallel to the rotational axis of the object. A probe tip is coupled to the pivoting arm, extends from the housing, and is configured to contact a portion of the object. A displacement measuring device is coupled to the pivoting arm and is configured to measure displacement of the probe tip in the direction parallel to the rotational axis of the object based on movement of the pivoting arm against one of the opposing compression springs.

A method for measuring a profile for a portion of an object includes positioning the object on a rotatable stage configured to receive and rotate the object along a rotational axis of the object. A housing is provided located adjacent to the rotatable stage and movable along the rotational axis of the cam shaft. The housing has a pivoting arm located between a pair of opposing compression springs and a probe tip coupled to the pivoting arm and extending from the housing. The housing is positioned proximate to the portion of the object. The housing is translated along the rotational axis of the object to provide contact between the probe tip and the portion of the object to provide a preload force on the pivoting arm from one of the opposing compression springs. Displacement of the probe tip in the direction parallel to the rotational axis of the object is measured using a displacement measuring device coupled to the pivoting arm based on movement of the pivoting arm against the one of the opposing compression springs to obtain a profile for the portion of the object.

A method of making a measuring device includes providing a rotatable stage configured to receive and rotate an object along a rotational axis of the object. A housing is provided located adjacent to the rotatable stage and movable along the rotational axis of the object. The housing has a pivoting arm located between a pair of opposing compression springs that provide a preload force in a direction parallel to the rotational axis of the object. A probe tip is coupled to the pivoting arm, extends from the housing, and is configured to contact a portion of the object. A displacement measuring device is coupled to the pivoting arm and is configured to measure displacement of the probe tip in the direction parallel to the rotational axis of the object based on movement of the pivoting arm against one of the opposing compression springs.

The claimed technology provides a number of advantages including providing a camshaft measuring device that provides a highly accurate trace of the profile of a sidewall of a camshaft groove along the axis of the camshaft. The trace can be obtained at high rotation speeds of the object with a large number of samples taken during each rotation to improve accuracy of the profile measurement. In some of these examples, the camshaft sidewall measuring device provides a sidewall measurement with an accuracy of five (5) micrometers or better. The device of the present technology further allows measurement of the profile both perpendicular to and parallel to the axis of the object using the same device.

DETAILED DESCRIPTION

Figure 1:
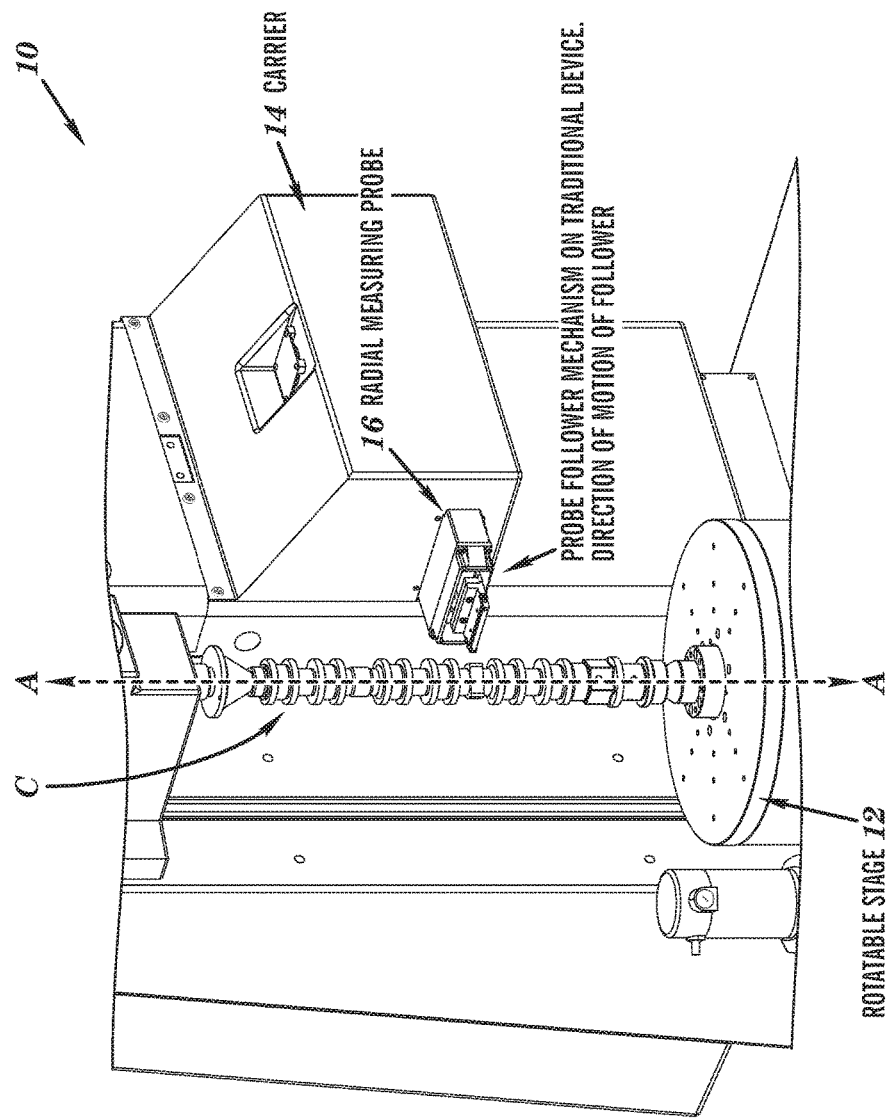
FIG. 1 is a perspective view of a prior art camshaft measurement gauge for measuring the profile of a camshaft perpendicular to the axis of the device.

An example of a camshaft measuring device 100 is illustrated in FIGS. 2-5. In this particular example, the camshaft measuring device 100 includes a rotatable stage 102, a carrier 104, a housing 106 including a pivoting arm 108, a probe tip 110, a displacement measuring device or gauge 112, and a camshaft measurement computing device 114, although the camshaft measuring device 100 may include other types and/or numbers of other systems, devices, components, or other elements in other configurations. Accordingly, this exemplary technology provides a number of advantages including providing a camshaft measuring device that provides a highly accurate trace of the profile of a sidewall of a camshaft groove along the axis of the camshaft.

Figure 2:
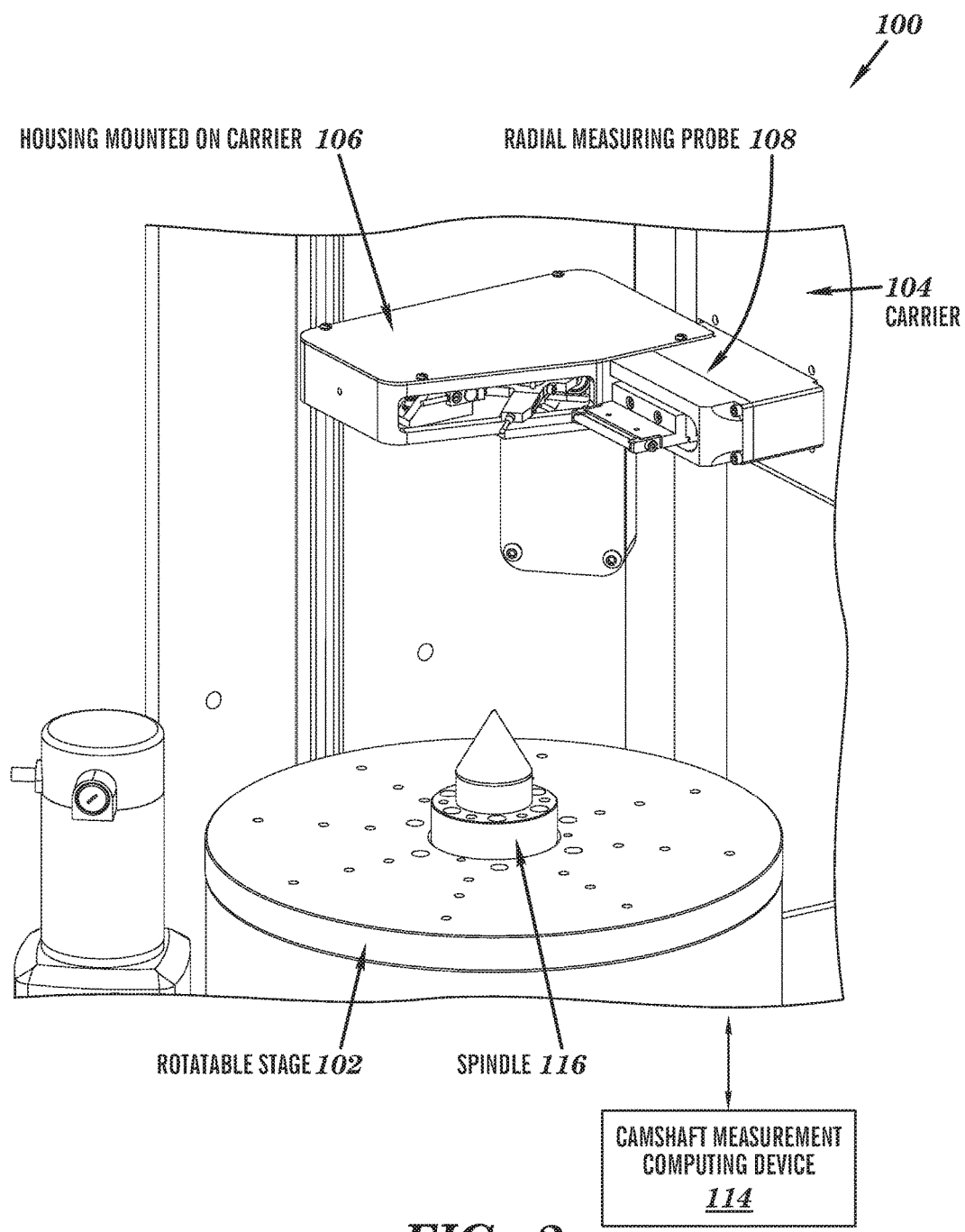
FIG. 2 is a perspective view of an example of a camshaft measuring device.

Referring more specifically to FIG. 2, in this particular example the rotatable stage 102 of the camshaft measuring device 100 is configured to be capable of receiving and rotating a camshaft along a rotational axis, although the rotatable stage 102 may receive other types and/or numbers of parts, such as a crankshaft, by way of example only, for measurement or other testing. The rotatable stage 102 includes a spindle 116 that holds the camshaft in place and provides the rotation of the camshaft about the rotational axis when installed on the rotatable stage 102, although the rotatable stage 102 may include other types and/or numbers of other systems, devices, components and/or other elements in other locations for holding and rotating the camshaft or other object to be measured or otherwise tested.

Additionally in this particular example, the spindle 116 is coupled to a high accuracy angle encoder (not shown) that provides the angular position of the camshaft as a digital signal to the camshaft measurement computing device 114, although other types and/or numbers of systems, devices, components and/or other elements may be utilized to determine the angular position of the camshaft about the rotational axis. The rotatable stage 102 rotates the camshaft by way of example only, at an angular velocity of 20 rotations per minute or more, although other rotation speeds may be utilized. In one example, the rotatable stage 102 may provide incremental rotations of the camshaft of a particular angular displacement value as determined by the angle encoder based on instructions from the camshaft measurement computing device 114, by way of example.

Figure 3:
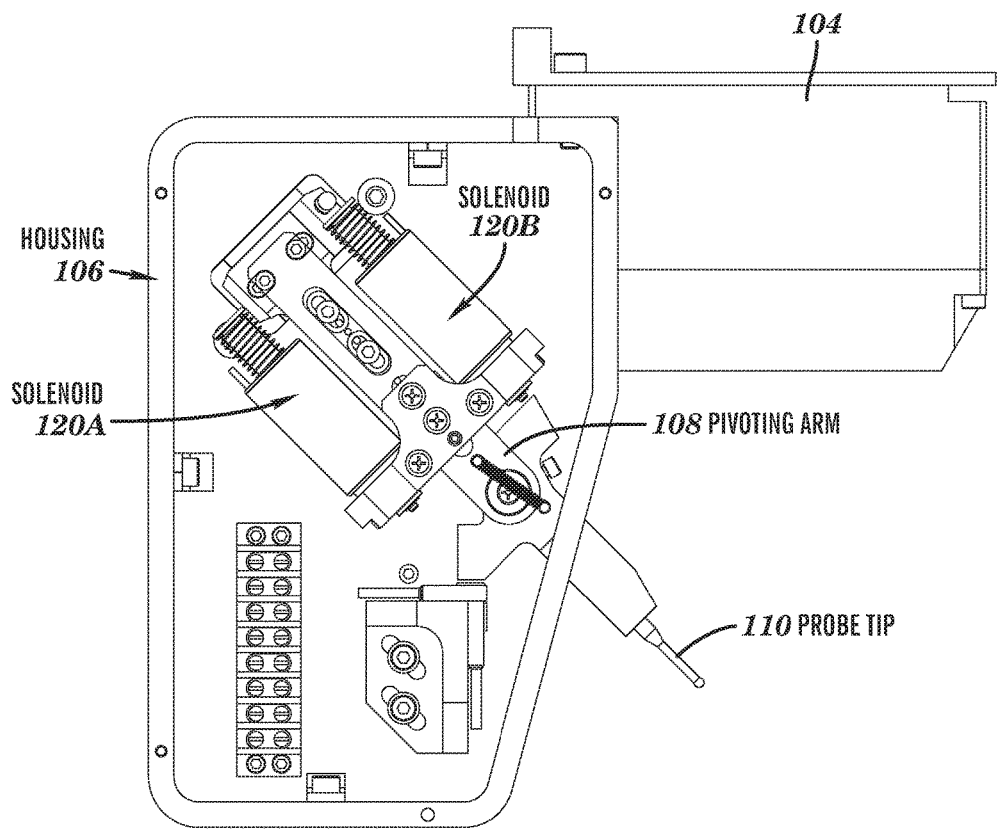
FIG. 3 is a top view of an example of a housing including a probe device that may be located adjacent to the rotatable stage of the camshaft measuring device shown in FIG. 2.
Figure 4:
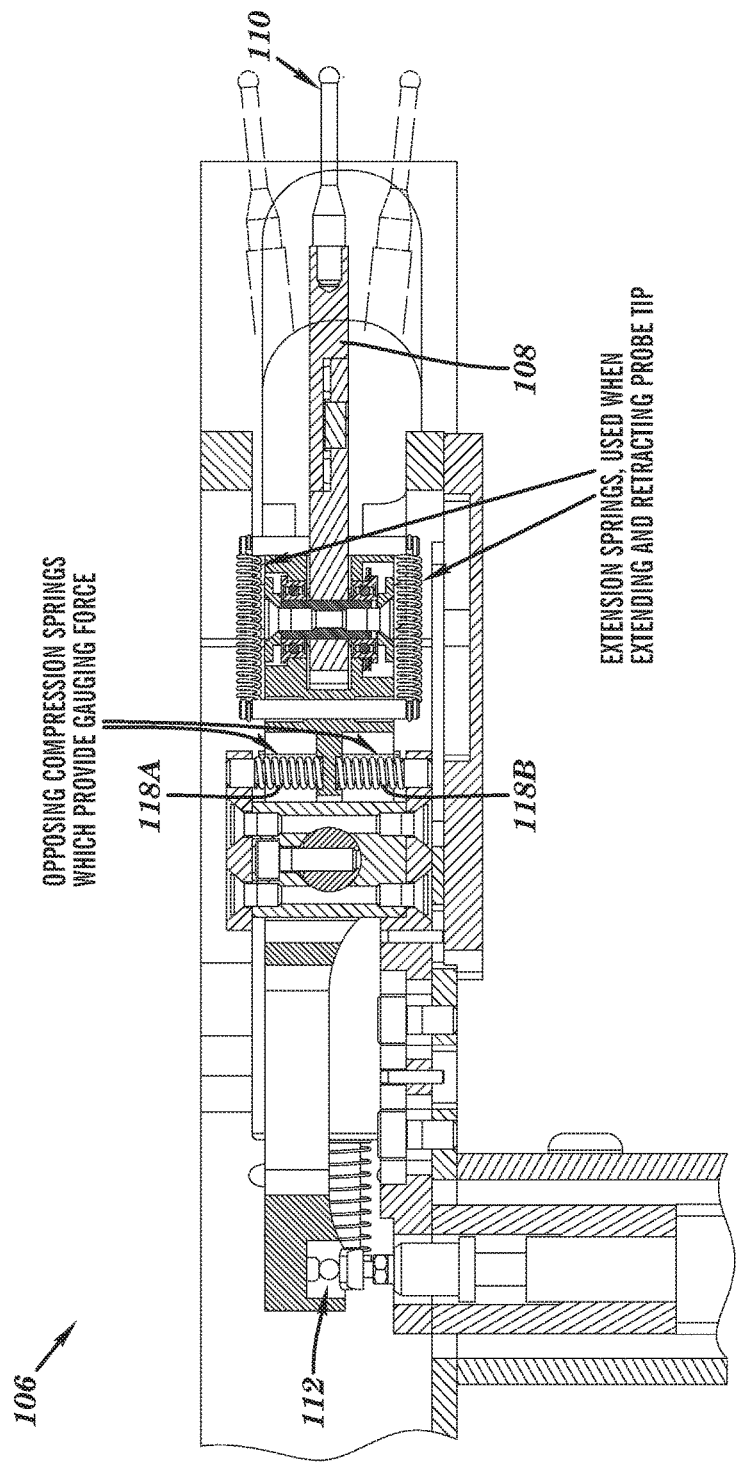
FIG. 4 is a side, cross-sectional view of the probe device shown in FIG. 3.
Figure 5:
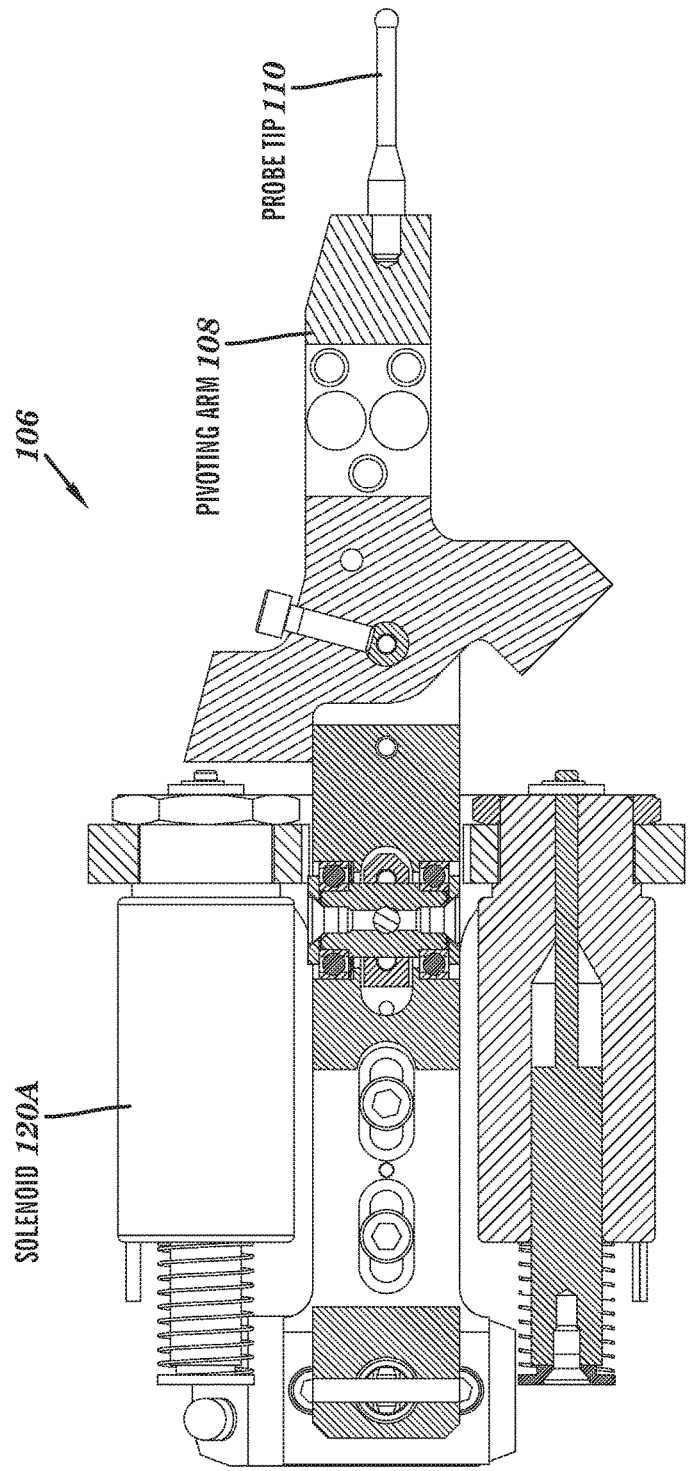
FIG. 5 is a top, cross-sectional view of the probe device shown in FIG. 3.

The carrier 104 is configured to hold the housing 106 of the camshaft measuring device 100 and is located adjacent to the rotatable stage 102. The carrier 104 is positioned near the rotatable stage 102 such that the probe tip 110 of the pivoting arm 108 installed in the housing 106, as shown in FIGS. 3-5, may contact the camshaft, or other part, installed on the rotatable stage 102. Referring again to FIG. 2, the carrier 104 is configured to be translated in the direction parallel to the axis of the camshaft, or other part, positioned on the rotatable stage 102 to move the housing 106 to different locations along the axis of the camshaft. The carrier 104 is operably coupled to the camshaft measurement computing device 114 in order to determine the precise position of the housing 106 along the axis of the camshaft, and in particular the location of the probe tip 110 of the pivoting arm 108 extending from the housing 106, with respect to the camshaft. The carrier 104 may be translated in either direction along the axis of the camshaft automatically under control of the camshaft measurement computing device 114, by way of example only, or may manually be adjusted and positioned along the axis of the camshaft by a user.

The housing 106 is coupled to the carrier 104 and is configured to move translationally along the axis of the camshaft installed on the rotatable stage 102 along with the carrier 104. Referring now more specifically to FIGS. 3-5, in this particular example the housing 106 includes the pivoting arm 108, which is configured to pivot in the direction along the axis of the camshaft when located on the rotatable stage 102, although the pivoting arm 108 can be configured to move in other manners. In one example, the pivoting arm 108 is also configured to pivot in the direction perpendicular to the axis of the camshaft to provide radial measurements of the camshaft. In this example, the pivoting arm 108 also includes a locking device (not shown) to limit or prevent axial movement of the pivoting arm 108 during radial measurements.

Referring now more specifically to FIG. 4, in this particular example the pivoting arm 108 is coupled to a pair of opposing compression springs 118A and 118B, although the pivoting arm 108 may be coupled to other types/numbers of systems, devices, components and/or other elements in other locations. The opposing compression springs 118A and 118B provide a preload force for the pivoting arm 108 in a direction parallel to the axis of the camshaft, although other systems, devices, components and/or other elements in other configurations may be utilized to provide the preload force on the pivoting arm 108. In this example, the opposing compression springs 118A and 118B are positioned with respect to the pivoting arm 108 to provide the preload force for the pivoting arm 108 in either axial direction.

In this example, the probe tip 110 is coupled to the pivoting arm 108 and extends from the housing 106. Additionally, in this example, the probe tip 110 includes a spherical tip configured to contact a sidewall of the camshaft, although other shaped tips, such as an involute tip, may be desirable as described below. The probe tip 110 provides the preload of the pivoting arm 108 against one of the opposing compression springs 118A or 118B. In this particular example, the stroke or displacement of the probe tip 110 is determined by the overall length of the probe tip 110. In one example, the stroke of the probe tip 110 is about ±10 mm or about ±6 degrees of angular displacement in the direction parallel to the axis of the camshaft when located on the rotatable stage 102. However, the stroke of the probe tip 110 may be increased or decreased by for example utilizing a longer or shorter probe. Increasing the length of the probe tip 110 may lead to increased cosine error, which may be reduced through use of an involute tip, as opposed to a spherical tip, for the probe tip 110. Alternatively, the increased cosine error may be adjusted for by the camshaft measurement computing device 114. In this example, the radial location of the probe tip 110 is adjustable plus or minus at least 3 millimeters to accommodate camshafts having lobe packs with differing base circle radii. In one example, the radial location of the probe tip 110 may be automatically positioned by mounting the device on a precision servo actuated slide.

In one example, the probe tip 110 is retractable to remove the probe tip 110 from the work area to provide the necessary clearance to for loading and unloading of the camshaft into the rotatable stage 102. By way of example, the probe tip 110 may be moveable an angle of 45 degrees or more if additional clearance is needed. In one example, the housing 106 may include a pair of solenoids 120A and 120B, as shown in FIG. 3, configured to generate a magnetic field to provide for the movement of the probe tip 110, although other types and numbers of systems, devices, components and/or other elements may be utilized to provide for retraction, or other movement, of the probe tip 110.

Referring now more specifically to FIG. 4, the displacement measuring device or gauge 112, which in this example is a plunger probe gauge, is coupled to the pivoting arm 108 and is configured to measure the displacement of the pivoting arm 108 against the preload force provided by the opposing compression springs 118A and 118B, although other types and/or numbers of gauges may be utilized to measure the displacement of the pivoting arm 108. By way of example only, a transducer may be utilized as the displacement measuring device or gauge 112 to convert the physical motion of the pivoting arm 108 into an electrical signal that may be converted to a digital signal and transferred to the camshaft measurement computing device 114 to determine the amount of displacement of the pivoting arm 108.

In this particular example, the camshaft measurement computing device 114 is a highly integrated microcontroller device with a variety of on-board hardware functions, such as analog to digital converters, digital to analog converters, serial buses, general purpose I/O pins, RAM, and ROM. The camshaft measurement computing device 114 includes, by way of example only, at least a processor and a memory coupled together with the processor configured to execute a program of stored instructions stored in the memory for one or more aspects of the present technology as described and illustrated by way of the examples herein, although other types and/or numbers of other processing devices and logic could be used and the camshaft measurement computing device 114 could execute other numbers and types of programmed instructions stored and obtained from other locations.

In another embodiment, the camshaft measurement computing device 114 may be located separate from the camshaft sidewall measuring device 100, such as in a separate machine processor or other computing device. The camshaft measurement computing device 114 may further communicate with other computing devices and/or servers comprising a processor coupled to a memory configured to execute a program of stored instructions stored in the memory for one or more aspects of the present technology as described and illustrated by way of the examples herein through, by way of example a serial data bus, although the camshaft measurement computing device 114 may communicate over other types and/or numbers of communication networks.

An exemplary operation of the camshaft sidewall measurement device 100 will now be described with reference to FIGS. 2-6. In operation, the camshaft to be measured is positioned on the spindle 116 of the rotatable stage 102, although other parts or objects, such as a crankshaft by way of example only, may be located on the rotatable stage 102 for measurement. A lobe pack of the camshaft may be rotated to a specific position based on a user selected starting location of inspection. The angular position of the lobe pack of the camshaft may be determined by an angular encoder (not shown) coupled to the spindle 116 of the rotatable stage 102.

Next, the carrier 104 is translated along a direction parallel to the axis of the camshaft to locate the housing 106 near a specific cam groove of the camshaft to be measured. The carrier 104 may be translated in this step with the probe tip 110 retracted, or radially displaced, to provide clearance when moving along the axis of the camshaft. Once the carrier 104 is in position, the probe tip 110 is extended to be positioned between two cam groove sidewalls.

The carrier 104 is then translated with the probe tip 110 extended until the probe tip 110 contacts a side wall of the camshaft groove. The carrier 104 may be translated in either axial direction to contact either the upper or lower (defined axially) camshaft groove wall for measurement. The probe tip 110 is then translated further in the same direction to cause the probe tip 110 to move axially due to the contact with the camshaft groove sidewall. The movement of the probe tip 110 provides a preload force for the pivoting arm 108 against one of the opposing compression springs 118A or 118B. In this example, the probe tip 110 is moved to a near maximum of its stroke (±10 millimeters in this example) to establish the preload of the pivoting arm 108 to provide a gauging force, although other movements of the probe tip 110 may be provided to provide other gauging preload forces.

Next, the camshaft is rotated on the rotatable stage 102. The spindle 116 of the rotatable stage 102 may be rotated at a rate of twenty (20) rotations per minute, although other rotation speeds may be utilized. As a result of the preload force established on the pivoting arm 108, rotation of the camshaft causes the probe tip 110 to follow along the sidewall of the camshaft groove during the rotation of the spindle 116. The changes in displacement of the probe tip 110 as it follows the contour of the sidewall of the camshaft groove are monitored by the displacement measuring device or gauge 112 and provided to the camshaft measurement computing device 114. The rotation of the spindle 116 may be accurately tracked using a high accuracy angle encoder (not shown), by way of example only. In this example, the angular position of the spindle 116 is also communicated to the camshaft measurement computing device 114. Thus, the displacement of the probe tip 110 and angular rotation of the spindle 116 may be utilized by way of example by the camshaft measurement computing device 114 to generate a profile of the camshaft sidewall. Over the course of a full rotation of the camshaft, the displacement of the probe tip 110, and therefore the pivoting arm 108, will vary based on the profile measurement for the camshaft sidewall.

Figure 6:
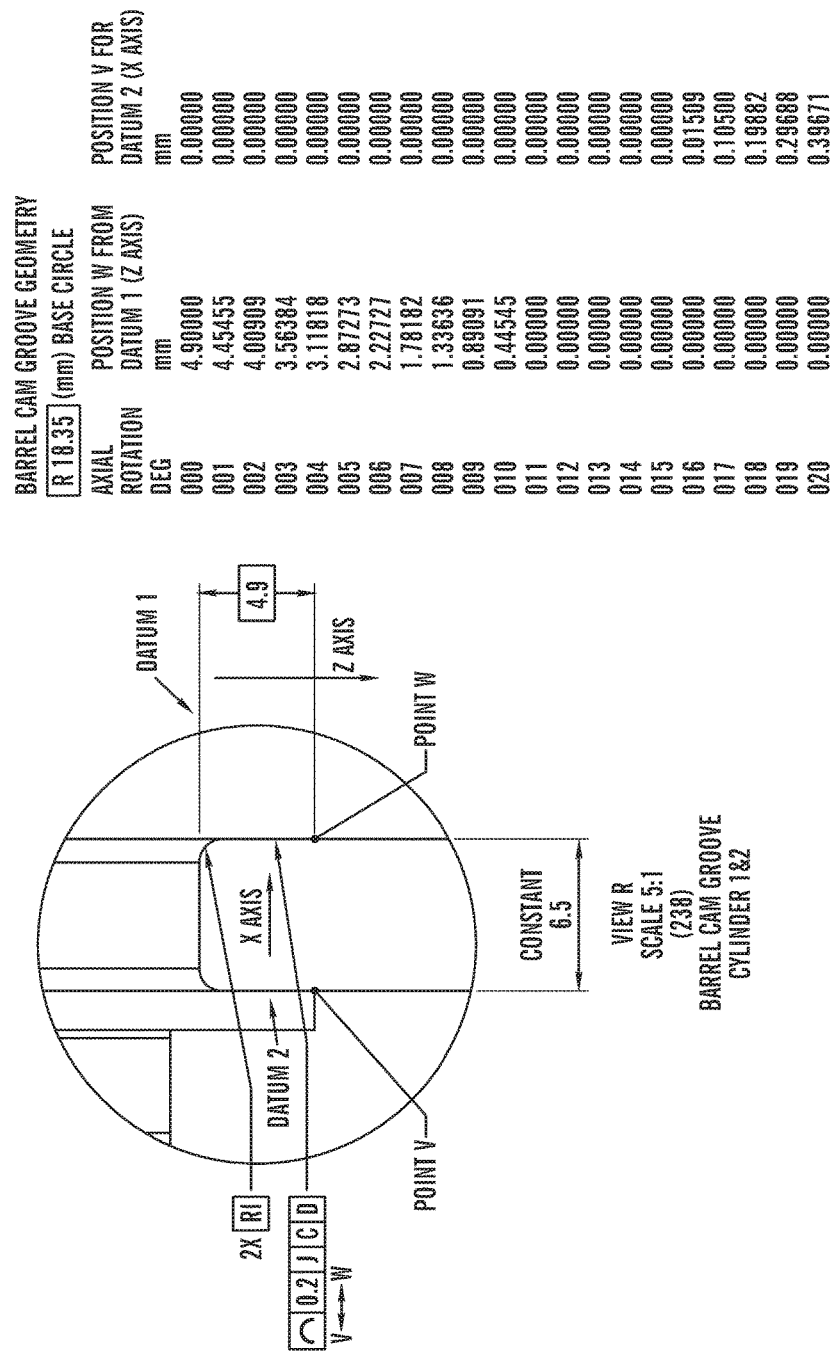
FIG. 6 is sample data obtained for measuring a camshaft sidewall using the camshaft measuring device and methods of the present technology.

In this example, a profile of the camshaft sidewall is assembled by the camshaft measurement computing device 114 from the array or plurality of displacement values based on the particular rotational angle of the camshaft. Additionally, in this example, the camshaft sidewall measuring device 100 may obtain 3600 data points per revolution of the camshaft to provide a high level of accuracy, although the camshaft sidewall measuring device 100 may obtain other numbers of data points per revolution. In one example, the data is accumulated over multiple rotations to provide redundancy in the data to decrease error. An exemplary data set obtained using the camshaft sidewall measuring device 100 for two sidewall locations on a camshaft based on angular rotation is illustrated in FIG. 6, by way of example only.

Accordingly, with this technology a highly accurate trace of the profile along the axis of the camshaft of a sidewall of a camshaft groove is obtained, although other dimensions of other objects may also be measured using the technology of the present disclosure. Examples of this technology advantageously provides a sidewall measurement with an accuracy of five (5) micrometers or better.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A measuring device comprising:
    a rotatable stage configured to receive and rotate an object along a rotational axis of the object;
    a housing located adjacent to the rotatable stage and movable in a direction parallel to the rotational axis of the object, the housing having a pivoting arm located between a pair of opposing compression springs, the compression springs configured to provide a preload force in either direction parallel to the rotational axis of the object;
    a probe tip coupled to the pivoting arm and extending from the housing, the probe tip configured to contact a portion of the object; and
    a displacement measuring device coupled to the pivoting arm, the displacement measuring device configured to measure displacement of the probe tip in the direction parallel to the rotational axis of the object based on movement of the pivoting arm against one of the opposing compression springs.

2. The measuring device as set forth in claim 1, further comprising:
    first and second solenoids configured to extend or retract the probe tip from the housing.

3. The measuring device as set forth in claim 2, wherein the first and second solenoids extend or retract the probe tip through at least a 45 degree angle.

4. The measuring device as set forth in claim 1, wherein the displacement of the probe tip has a maximum of 10 mm in either direction parallel to the rotational axis of the object.

5. The measuring device as set forth in claim 1, wherein a radial location of the probe tip is adjustable by at least 3 mm.

6. The measuring device as set forth in claim 1, wherein the rotatable stage provides rotation of the object of at least 20 rotations per minute.

7. The measuring device as set forth in claim 1 further comprising:
    a measurement computing device coupled to the displacement measuring device, the measurement computing device comprising a processor and a memory coupled to the processor which is configured to be capable of executing programmed instructions comprising and stored in the memory to:
        receive a plurality of displacement measurements of the probe tip from the measuring device at a plurality of angular displacements of the object; and
        determine a profile of the portion of the object based on the received plurality of displacement measurements.

8. The measuring device as set forth in claim 7, wherein the camshaft measurement computing device receives at least 3600 displacement measurements of the probe tip from the gauge per revolution of the camshaft.

9. The measuring device as set forth in claim 1, wherein the pivoting arm is selectively movable both perpendicular and parallel to the axis of the object.

10. The measuring device as set forth in claim 1, wherein the rotatable stage is configured to receive and rotate a camshaft and the probe tip is configured to contact a sidewall of the camshaft.

11. The measuring device as set forth in claim 1, wherein the displacement measurement device comprises a plunger probe gauge or a transducer.

12. A method for measuring a profile for a portion of an object, the method comprising:
    positioning the object on a rotatable stage configured to receive and rotate the object along a rotational axis of the object;
    providing a housing located adjacent to the rotatable stage and movable along the rotational axis of the object, the housing having a pivoting arm located between a pair of opposing compression springs and a probe tip coupled to the pivoting arm and extending from the housing;
    positioning the housing proximate to the portion of the object;
    translating the housing in a direction parallel to the rotational axis of the object to provide contact between the probe tip and the portion of the object to provide a preload force on the pivoting arm from one of the opposing compression springs, the compression springs configured to provide the preload force in either direction parallel to the rotational axis of the object; and
    measuring displacement of the probe tip in the direction parallel to the rotational axis of the object using a displacement measuring device coupled to the pivoting arm based on movement of the pivoting arm against the one of the opposing compression springs to obtain a profile for the portion of the object.

13. The method as set forth in claim 12, wherein the providing the housing further comprises providing first and second solenoids configured to extend or retract the probe tip from the housing.

14. The method as set forth in claim 13, wherein the first and second solenoids extend or retract the probe tip through at least a 45 degree angle.

15. The method as set forth in claim 12, wherein the displacement of the probe tip has a maximum of 10 mm in either direction parallel to the rotational axis of the object.

16. The method as set forth in claim 12, wherein a radial location of the probe tip is adjustable by at least 3 mm.

17. The method as set forth in claim 12, wherein the rotatable stage provides rotation of the object of at least 20 rotations per minute.

18. The method as set forth in claim 12 further comprising:
    receiving, by a measurement computing device, a plurality of displacement measurements of the probe tip from the displacement measuring device at a plurality of angular displacements of the object; and
    determining, by the measurement computing device, a profile of the portion of the object based on the received plurality of displacement measurements.

19. The method as set forth in claim 18, wherein the receiving further comprises receiving at least 3600 displacement measurements of the probe tip from the gauge per revolution of the object.

20. The method as set forth in claim 12, wherein the pivoting arm is selectively movable both perpendicular and parallel to the axis of the object.

21. The method as set forth in claim 12, wherein the object is a camshaft and the probe tip is configured to contact a sidewall of the camshaft.

22. The method as set forth in claim 12, wherein the displacement measurement device comprises a plunger probe gauge or a transducer.

23. A method of making a measuring device comprising:
providing a rotatable stage configured to receive and rotate an object along a rotational axis of the object;
providing a housing located adjacent to the rotatable stage and movable in a direction parallel to the rotational axis of the object, the housing having a pivoting arm located between a pair of opposing compression springs, the compression springs providing a preload force in either direction parallel to the rotational axis of the object;
coupling a probe tip to the pivoting arm, the probe tip extending from the housing and configured to contact a portion of the object; and
coupling a displacement measuring device to the pivoting arm, the displacement measuring device configured to measure displacement of the probe tip in the direction parallel to the rotational axis of the object based on movement of the pivoting arm against one of the opposing compression springs.

24. The method as set forth in claim 23, further comprising:
providing first and second solenoids configured to extend or retract the probe tip from the housing.

25. The method as set forth in claim 24, wherein the first and second solenoids extend or retract the probe tip through at least a 45 degree angle.

26. The method as set forth in claim 23, wherein the displacement of the probe tip has a maximum of 10 mm in either direction parallel to the rotational axis of the camshaft.

27. The method as set forth in claim 23, wherein a radial location of the probe tip is adjustable by at least 3 mm.

28. The method as set forth in claim 23, wherein the rotatable stage provides rotation of the object of at least 20 rotations per minute.

29. The method as set forth in claim 23 further comprising:
coupling a measurement computing device to the displacement measuring device, the measurement computing device comprising a processor and a memory coupled to the processor which is configured to be capable of executing programmed instructions comprising and stored in the memory to:
receive a plurality of displacement measurements of the probe tip from the displacement measuring device at a plurality of angular displacements of the object; and
determine a profile of the portion of the object based on the received plurality of displacement measurements.

30. The method as set forth in claim 29, wherein the measurement computing device receives at least 3600 displacement measurements of the probe tip from the displacement measuring device per revolution of the object.

31. The method as set forth in claim 23, wherein the pivoting arm is selectively movable both perpendicular and parallel to the axis of the object.

32. The method as set forth in claim 23, wherein the object is a camshaft and the probe tip is configured to contact a sidewall of the camshaft.

33. The method as set forth in claim 23, wherein the displacement measurement device comprises a plunger probe gauge or a transducer.

* * * * *